United States Patent
Braunstorfinger et al.

(10) Patent No.: US 8,098,706 B2
(45) Date of Patent: Jan. 17, 2012

(54) SIGNAL GENERATOR FOR A DSSS OR CDMA SIGNAL

(75) Inventors: Thomas Braunstorfinger, Munich (DE); Wolfgang Kufer, Muehldorf (DE)

(73) Assignee: Rohde & Schwarz GmbH & Co. KG, München (DE)

( * ) Notice: Subject to any disclaimer, the term of this patent is extended or adjusted under 35 U.S.C. 154(b) by 2368 days.

(21) Appl. No.: 10/481,290

(22) PCT Filed: Apr. 30, 2002

(86) PCT No.: PCT/EP02/04759
§ 371 (c)(1), (2), (4) Date: May 24, 2004

(87) PCT Pub. No.: WO03/003579
PCT Pub. Date: Jan. 9, 2003

(65) Prior Publication Data
US 2004/0196889 A1    Oct. 7, 2004

(30) Foreign Application Priority Data
Jun. 26, 2001   (DE) .................................. 101 30 686

(51) Int. Cl.
*H04B 1/00* (2006.01)
(52) U.S. Cl. ........................................ 375/130; 375/148
(58) Field of Classification Search .................. 375/148, 375/130
See application file for complete search history.

(56) References Cited

U.S. PATENT DOCUMENTS
6,658,046 B1 * 12/2003 Miura ........................... 375/148

FOREIGN PATENT DOCUMENTS
| DE | 31 29 911 A1 | 3/1983 |
| EP | 0 570 273 A1 | 11/1993 |
| WO | WO 00/05902 A2 | 2/2000 |
| WO | WO 00/05902 A3 | 2/2000 |

OTHER PUBLICATIONS

Alsolaim, A., et al., "Architecture and Application of a Dynamically Reconfigureable Hardware Array for Future Mobile Communication Systems," Apr. 2000, pp. 205-214.*

* cited by examiner

*Primary Examiner* — David Payne
*Assistant Examiner* — Tanmay Shah
(74) *Attorney, Agent, or Firm* — Christensen O'Connor Johnson Kindness PLLC

(57) ABSTRACT

The invention relates to a signal generator for a DSSS or CDMA signal, comprising several spread sequence memories and a digital signal processor which pre-calculates the spread sequence in an initialization phase and deposits the same in the spread sequence memory, and which supplies data symbols to an image memory in an operating phase. Each image memory contains an image table by means of which the bits of the current data symbols and at least one current bit of the spread sequence, which is sequentially read from every spread sequence memory, is imaged in at least one output value.

15 Claims, 3 Drawing Sheets

SIGNAL GENERATOR FOR A DSSS OR CDMA SIGNAL

The invention relates to a signal generator for a DSSS signal and/or a CDMA signal. There is understood by a signal generator in the sense of this patent application, a signal source of any type, for example also operating equipment (base stations, mobile stations), measuring devices etc.

The DSSS (Direct Sequence Spread Spectrum) method increases the bandwidth of a signal, in that a high rate spread sequence is modulated with the useful data. Due to the higher bandwidth of the signal in the case of constant energy of the transmission signal, the signal becomes less sensitive to frequency-selective interferences, for example variable fading.

In the case of the CDMA (Code Division Multiple Access) method, many useful data flows are transmitted simultaneously on one frequency, each individual useful data flow being modulated with the DSSS method and spread sequences used during the modulation being chosen such that they have as small a cross-correlation as possible, i.e. are orthogonal. In order to be able to differentiate between a plurality of transmitting stations, the spread sequence in the case of CDMA systems usually comprises an orthogonal code (e.g. Walsh code) and a transmitter-dependent pseudo-random sequence, the so-called scrambling code. With a CDMA method, some standards operate for the second generation mobile radio (for example IS 95) and most standards for the third generation mobile radio, for example IS2000, 3GPP FDD, 3GPP TDD and TD/SCDMA.

For better understanding of the invention, a basic circuit diagram for generating a CDMA signal comprising N channels is recorded subsequently with reference to FIG. 1. Similar structures are described for example in Tero Ojanperä and Ramjee Prasad "Wide Band CDMA for Third Generation Mobile Communications", Artec House, 1998, Chapter 2.4.1 "Downlink Channel Structure" and 2.4.2 "Uplink Channel Structure", pages 51-58.

Figure 1:
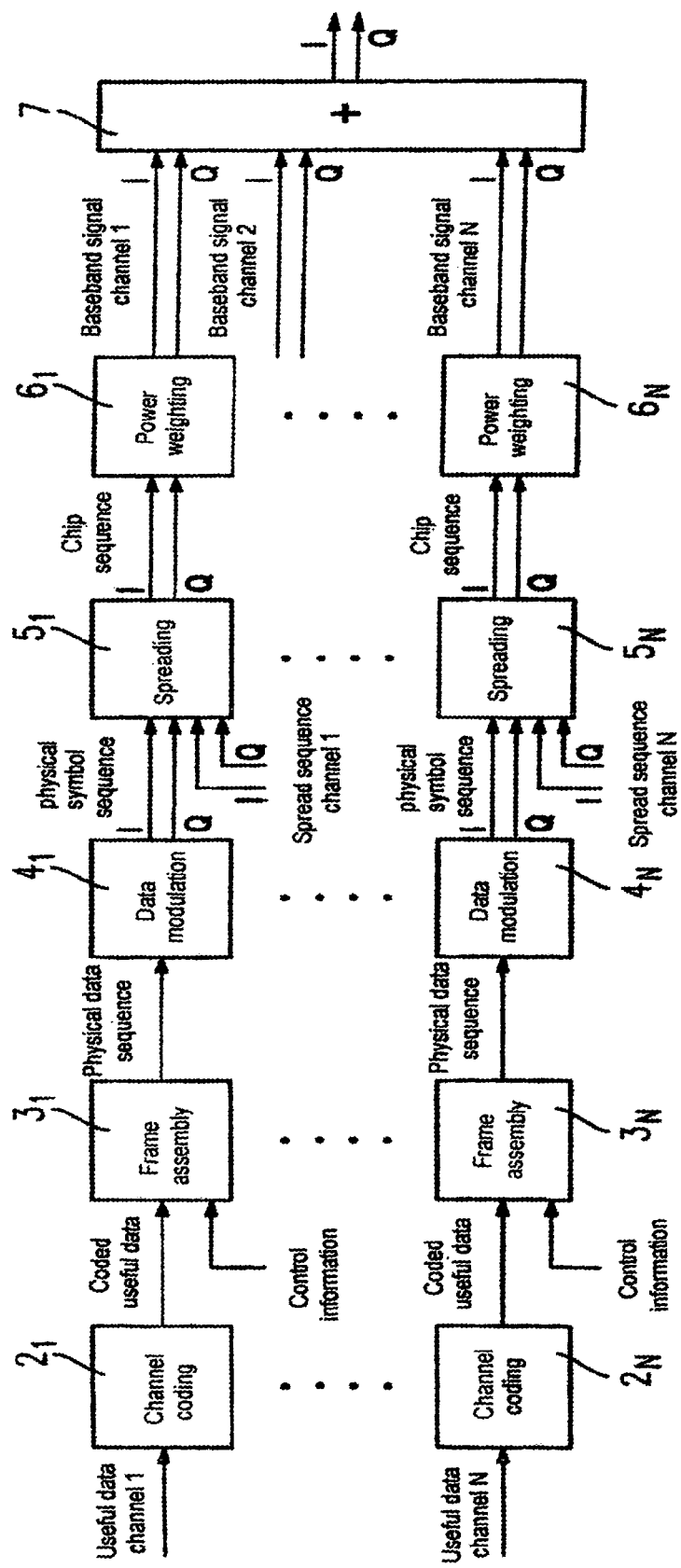

The total signal generated with the basic circuit diagram illustrated in FIG. 1 comprises added-up contributions of the N channels. In each of the N channels, a partial signal is generated by the subsequently described processing steps. The useful data (e.g. digitalised and coded language or signalisation information) are subjected to a channel coding $2_1$, $2_N$ which typically comprises test summation, convolution coding and interleaving. From the thus coded data and physical control information (e.g. pilot signals, training sequences or control bits for a power control), the frames are subsequently assembled ($3_1$, $3_N$) and the physical data sequence is produced. The generation of control bits, which can serve for example for blanking specific components in the frame and for increasing the power of specific frame parts, is not illustrated in FIG. 1. The physical data sequence is imaged in the next step, the data modulation $4_1$, $4_N$, in the I/Q plane, normally BPSK (Binary Phase Shift Keying) or QPSK (Quaternary Phase Shift Keying) modulations being used. The complex symbols are now spread with a generally complex value spread sequence, the spreading generally being carried out as a complex multiplication with the symbol flow. With the spread $5_1$, $5_N$, the bandwidth of the signal increases by the spread factor for example from 30 kHz to 3840 kHz. The thus produced complex value chip sequence is weighted by the channel power ($6_1$, $6_N$) and summated with the contributions of the other channels, which are generated in the same manner (7). The I/Q summated signal is then filtered (no longer shown in FIG. 1) and converted via an I/Q modulator into the intermediate frequency plane or high frequency plane.

The present invention deals with the production of the frame assembly $3_1$, $3_N$, the data modulation $4_1$, $4_N$, the spread $5_1$, $5_N$, the power weighting $6_1$, $6_N$ and the summation 7.

Normally, DSSS and CDMA signals are generated with a very high hardware outlay inter alia by using shift registers. This is known for example from U.S. Pat. No. 5,193,094. Special hardware must thereby be provided for each CDMA standard since the respective standards differ in numerous points. For example, the frame assembly in the individual standards is extremely varied since various pilot signals and various training sequences are used. One of the most important wideband CDMA standards "3GPP FDD Downlink" comprises 50 different frame formats alone for only one channel type. In the case of approximately 10 channel types per standard and 10 CDMA standards, this multiplicity cannot be covered by one single hardware item. In addition to the normal modulation types, BPSK and QPSK, higher value modulations are also used. Numerous variants are also known in the case of BPSK and QPSK. The spread is performed differently in each standard. This concerns in particular the calculation of the orthogonal component of the spread sequence, the calculation of the scrambling code component of the spread sequence, the calculation of the spread sequence from the two above-mentioned components and also the calculation of the chip sequence from the physical symbol sequence and the spread sequence.

In the case of operating equipment, the cost of the previously common hardware production is still to a certain extent manageable since operating equipment must control only the standard of those appliances for which they are designed. In the case of signal generators for measuring purposes, which must be suitable for the development and testing of base stations and mobile stations of mobile radio systems which operate according to the most varied of standards, the hardware outlay thereby comprises a single chip set for each standard or comprises FPGAs which are reconfigured upon changing the standard. In the development outlay for the totality of the FPGA configurations, the number of standards is almost linear since the partial functions must be reproduced each time.

The object therefore underlying the invention is to produce a signal generator for a DSSS and/or CDMA signal which manages with a low hardware outlay, signals of a normal DSSS and/or CDMA standard being able to be generated with a single circuit.

The object is achieved by the features of claim 1.

The concept underlying the invention is to combine a digital signal processor with a universal hardware circuit, with which DSSS and/or CDMA signals can be generated with a particularly low outlay. The spread sequence is thereby precalculated by the digital signal processor and stored in a spread sequence memory in an initialisation phase. In the operating phase, the data symbols from the digital signal processor are transferred to an image memory, the image memory containing an image table, with which the bits of the current data symbols and a bit of the spread sequence read out sequentially from the spread sequence memory are imaged into respectively one output value.

The sub-claims relate to advantageous developments of the invention.

The processing can be effected separately for the I (in phase) component and the Q (quadrature phase) component. The image memory can contain a channel-specific amplification factor.

A buffer memory (e.g. FIFO) is preferably provided between the signal processor and the image memory, said buffer memory emitting a reload request (interrupt) to the digital signal processor when a boundary level is fallen below.

If a plurality of parallel CDMA channels with the same data sequence and same power is to be produced, a common image memory can be used for these channels. An address register can thereby be provided between the buffer memory and the image memory, said address register enabling switching of the address supplied to the image memory dependent upon the current channel.

The image memory can preferably be written-to at the same time parallel to the reading in order to enable reprogramming of the image table with a continuous output.

Figure 2:
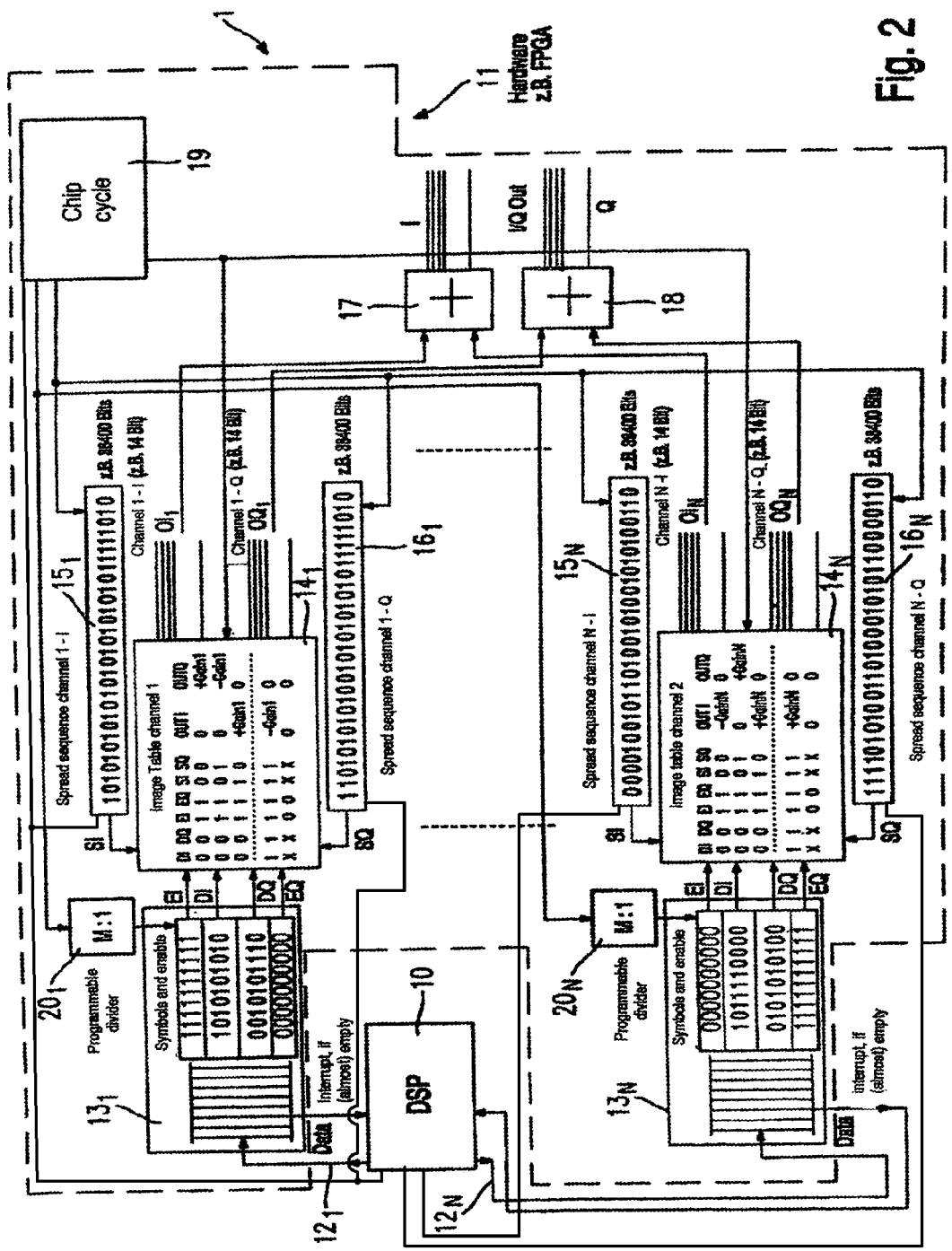
Figure 3:
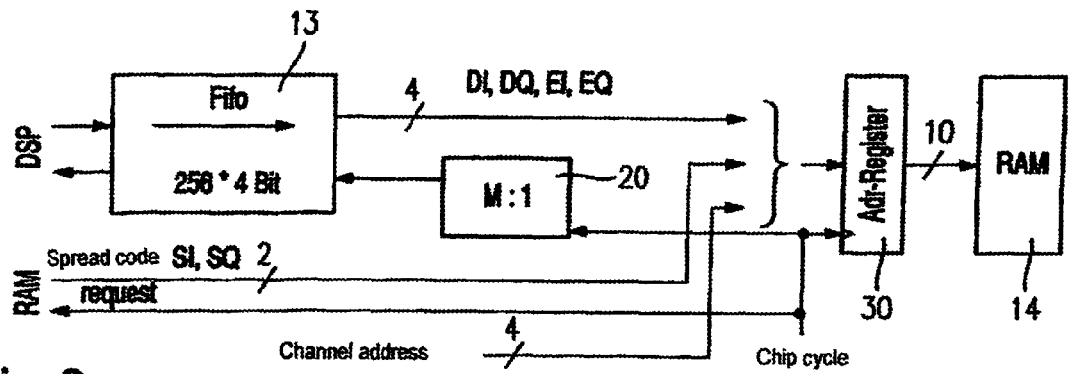
Figure 4:
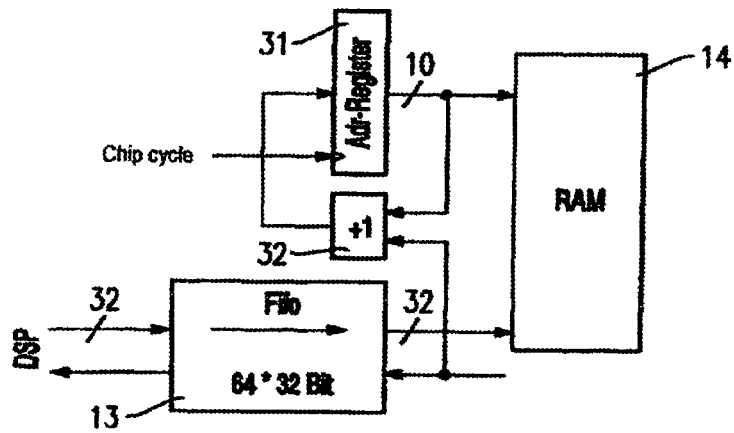

Several embodiments of the invention are described subsequently in more detail with reference to the drawing. There are shown in the drawing:

FIG. 1 a basic circuit diagram of the individual processing steps when generating a CDMA signal;

FIG. 2 a block diagram of the signal generator according to the invention;

FIG. 3 a modified detail from FIG. 2;

FIG. 4 a further modified detail from FIG. 2; and

Figure 5:
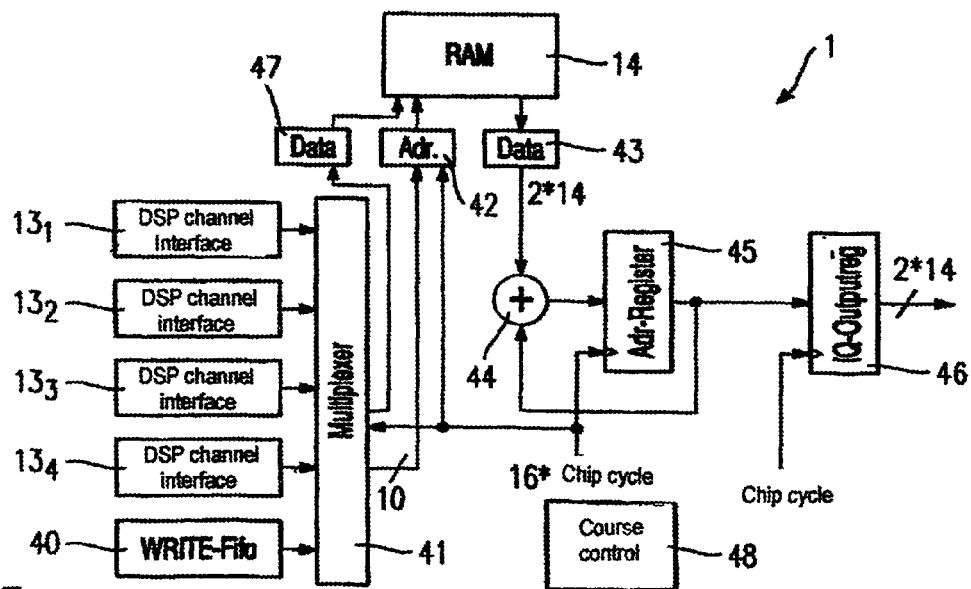

FIG. 5 a further embodiment of the signal generator according to the invention.

FIG. 2 shows a block diagram of a signal generator 1 according to the invention. The signal generator 1 is divided into a digital signal processor 10 and a hardware circuit 11 which can be produced for example as FPGA. The digital signal processor 10 concerns either a special processor for processing digital signals or a universal CPU.

In total, N channels are present, firstly the $1^{st}$ channel illustrated at the top in FIG. 2 being described subsequently.

The digital signal processor 10 is in communication via a line $12_1$ with a buffer memory $13_1$, the data content of which is reproduced by way of example for the first ten data words. Each data word comprises in total four bits, respectively a data symbol bit DI and DQ for the I component and the Q component. Furthermore, an enable bit (control bit) EI or EQ is provided for the I component or Q component. The buffer memory $13_1$ is in communication via the above-described bit lines for EI, DI, DQ, EQ with an image memory $14_1$. Furthermore, a first spread sequence memory $15_1$ for the I component and a second spread sequence memory $16_1$ for the Q component are present. The spread sequence memories $15_1$ and $16_1$ contain a pseudo-random, cyclic spread sequence which comprises 38400 bits in the illustrated embodiment. The spread sequence memories $15_1$ and $16_1$ are read out bit-wise and can be addressed as ring memories, i.e. the sequence is repeated every 38,400 bits in the example. The immediately read out bit SI of the spread sequence for the I component and SQ of the spread sequence for the Q component is likewise supplied to the image memory $14_1$.

The image memory $14_1$ contains an image table, with which the bits of the current data symbols DI, DQ, the enable bits EI, EQ and also the current bits of the spread sequence SI, SQ are imaged in an I output value $OI_1$ and a Q output value $OQ_1$. The output values $OI_1$ and $OQ_1$ represent voltage values in the I/Q plane which are resolved with 14 bit in the illustrated example. The assignment is effected in the manner of a look-up table, an amplification factor Gain1 being assigned to the $1^{st}$ channel and this amplification factor Gain1 being already contained in the image table.

When the buffer memory $13_1$ is still only loaded up to a filled boundary level, i.e. is almost empty, then the latter generates a reload request in the form of an interrupt to the digital signal processor 10. As a result, the processing priority of the digital signal processor 10 is controlled such that the latter loads the buffer memory $13_1$ again as a matter of priority.

In the embodiment illustrated in FIG. 2, the structure described above for the $1^{st}$ channel is present for each of the in total N channels. In FIG. 2, the $N^{th}$ channel is again illustrated, the index N being used with the reference numbers. The amplification of the $N^{th}$ channel is GainN, the $2^{nd}$ to $N-1^{th}$ channel are configured in the same manner but not illustrated in FIG. 2.

At a first adder 17, all the output values $OI_1$ to $OI_N$ respectively of the I component of all channels are added to form a total output value I. Correspondingly, all output values $OQ_1$ to $OQ_N$ of all the channels are added at a second adder 18 to form a total output value Q.

At a central chip clock generator 19, a chip cycle is generated which is supplied directly to the image memories $14_1$, $14_N$ and the spread sequence memories $15_1$, $16_1$, $15_N$, $16_N$. The chip cycle reduced by the spread factor M is supplied to the buffer memories $13_1$, $13_N$. The reduced chip cycle is generated respectively in a programmable divider $20_1$, $20_N$ which can also be present in common for all channels.

The following differences arise relative to the mode of operation according to the state of the art.

The frame is assembled by DSP software and transferred to the hardware via the buffer memories $13_1$, $13_N$. In parallel to the physical data sequence DI, DQ, the digital signal processor also calculates the enable bits EI, EQ, which serve for example for blanking specific frame parts. Hence the numerous variants of the frame assembly can be implemented substantially more quickly. At the same time, the grid complexity of the circuit is reduced.

The spread sequence is not calculated by generators in the hardware but pre-calculated by the digital signal processor 10 and stored in a spread sequence memory $15_1$, $16_1$, $15_N$, $16_N$ which is accessible to the hardware 11. This must be effected in an initialisation phase only once before the generation of the signal since the spread sequences are periodic and a complete period requires only relatively little memory.

The spread itself is produced at the same time as the data modulation and the power weighting in a table-look-up method, the hardware 11 calculating an address from the physical data bits EI, DI, DQ and EQ and the current bits of the spread sequence SI and SQ, under which address the voltage values for the I component and the Q component are stored. The digital signal processor 10 calculates the image table during an initialisation phase and stores this in the image memory $14_1$, $14_N$ accessible by the hardware 11.

The size of the image table in the image memory $14_1$, $14_N$ is calculated from the number ND of data bits DI, DQ, from the number NS of enable bits EI, EQ, from the constant number 2 of spread bits SI, SQ and the resolution $A_{OUT}$. That of the output values $OI_1$, $OQ_1$, $OI_N$, $OQ_N$. The number of lines of the table is hence $2^{ND+NS+2}$. $2 \cdot A_{OUT}$ bits must be provided per line.

In an initialisation phase, the digital signal processor 10 calculates the spread sequences and image tables and stores these in the respective memory $14_1$, $14_N$, $15_1$, $15_N$, $16_1$, $16_N$. Furthermore, the digital signal processor 10 programmes the central chip clock generator 19 and the spread factors M of the programmable dividers $20_1$, $20_N$.

In an operating phase, the digital signal processor 10 calculates the physical data sequences DI, DQ and the associated enable bits EI, EQ and writes these into the buffer memories $13_1$, $13_N$ which can be configured for example as FIFO (First In First Out). The computing power of the digital signal processor 10 should be chosen such that all buffer memories $13_1$, $13_N$ can be reloaded before they empty. From the currently oldest data bits and enable bits DI, DQ, EI, EQ of the buffer memory $13_1$, $13_N$ and the current read out bits SI, SQ of the spread sequence, an address word is formed which addresses the image table in the image memory $14_1$, $14_N$. The image memory $14_1$, $14_N$ is read out at the thus calculated address, as a result of which the I output value $OI_1$, $OI_N$ and the Q output value $OQ_1$, $OQ_N$ is obtained. The output values $OI_1$-$OI_N$, $OQ_1$-$OQ_N$ of all the channels are added up at the adders 17, 18 and provided at the output of the signal generator 1.

There are applications in which a plurality of parallel CDMA channels with the same data modulations and powers must be generated. The same image table or the same image memory can be used hereby for a plurality of channels if the circuit illustrated in FIG. 2 is modified as illustrated in FIG. 3. A first address register 30 is inserted between the buffer memory 13 and the image memory $14_1$. The address for the image memory 14 is thereby determined from three components: the physical symbol sequence DI, DQ if necessary with the enable bits EI, EQ, the current bits SI, SQ of the spread sequence and a quasi-static channel address which comprises for example 4 bits. The channel address goes into the address word as the highest value bits. For all channels with the same image table, the address register 30 is programmed in the initialisation phase for identical addresses.

For specific applications it is desirable to reprogramme the image table already during the output. This is for example necessary when the transmission power of a channel is to be changed dynamically.

FIG. 4 shows a corresponding modification of the block diagram illustrated in FIG. 2. The address of the memory region of the image memory 14 to be written-to is written into a second address register 31. Thereafter, the I/Q value pairs are written into the image table of the image memory 14 via the buffer memory 13, the address with each written value pair being incremented automatically in an incrementor 32. Alternatively, an automatic decrement is of course also possible.

FIG. 5 shows another embodiment of the signal generator 1 according to the invention. This architecture is suitable in particular for an implementation with FPGAs or ASICs. Since the memories and the programmable logic permit a substantially higher processing rate than is required for a CDMA channel (e.g. 100 MHz relative to 4 MHz), the reading out of the I/Q values from the image table, the adding up of the channel contributions to form the sum signal I/Q and the writing of the image table can be controlled sequentially effectively by an effective course control. Thus a higher cycle rate can be used and the requirement for logic cells can be reduced.

In the embodiment illustrated in FIG. 5, a buffer memory $13_1$, $13_2$, $13_3$ or $13_4$ is provided for each of the four, for example, channels, which buffer memory, during reading, contains the memory address of the output value IQ to be read from the common image memory 14 for this channel. Furthermore a write buffer memory 40 is provided. The channel buffer memories $13_1$, $13_2$, $13_3$, $13_4$ and the write buffer memory 40 are connected to a multiplexer 41 which supplies the address read out from the respective buffer memory $13_1$, $13_2$, $13_3$, $13_4$, 40 to an address register 42. The I/Q output values read out from the image memory 14 are stored intermediately in a first data register 43 which is in communication with a first input of an adder 44. At the output of the adder 44 an adder register 45 is located, the output of which is connected to the other input of the adder 44. In an I/Q output register 46, the I/Q output values are available after the addition of the individual channels. The table data to be stored in the image memory 14 are buffered in a second data register 47. A course control 48 takes over the control of the course to be described subsequently.

The mode of operation of the circuit illustrated in FIG. 5 is as follows: firstly the adder register 45 is deleted for each chip cycle. Then, via the channel buffer memory 131 and the multiplexer 41, the address of the first channel is loaded into the address register 42, the associated I/Q value is written into the first data register 43 and, at the adder 44, is added to the previously deleted content of the adder register 45. Then, via the channel buffer memory $13_2$ and the multiplexer 41, the address of the second channel is written into the address register 42, the associated I/Q value is read out from the image memory 14, written into the first data register 43, added by means of the adder 44 to the I/Q value of the first channel included by the adder register 45. Then, via the buffer memory $13_3$ and the multiplexer 41, the address of the third channel is loaded into the address register 42, the associated I/Q value is transferred into the first data register 43 and is added by means of the adder 44 to form the summated output value of the first and second channel. Finally, via the buffer memory 134 and the multiplexer 41, the address of the fourth channel is loaded into the address register 42, the associated I/Q value of the image memory 14 is transferred into the first data register 43 and is added by means of the adder 44 to form the summation value of the first, second and the third channel. Then the value of the adder register 45 is taken over if necessary after a division by the number of active channels into the I/Q output register 46.

Some time remains until the I/Q value of the first channel of the next chip must be read out of the image memory 14. The course control 48 can use this time, if required, by actualising the image table of the image memory 14. For this purpose, the start address for the memory region of the image memory 14 to be overwritten is loaded initially from the write buffer memory 40. Subsequently, a plurality of data words can be taken over from the write buffer memory 40 by the multiplexer 41, supplied successively to the second data register 47 and entered in the image table of the image memory 14. The current write address can then, as illustrated in FIG. 4 and left out in FIG. 5 for reasons of simplification, be incremented or decremented from data word to data word.

The invention is not restricted to the illustrated examples. A plurality of digital signal processors 10 can also be used instead of a single digital signal processor 10. The required computing power of the digital signal processors 10 depends inter alia upon the number of CDMA channels, the spread factor M of the channels and the costs for calculating the data bits DI, DQ and enable bits EI, EQ. The real time condition for the digital signal processors 10 is that all the buffer memories $13_1$, $13_N$ can be reloaded before they empty. If this real time condition cannot be fulfilled by a single digital signal processor 10, then the number of digital signal processors used can be extended without difficulties since this task is parallel to a high degree. The use of a plurality of digital signal processors 10 can also be sensible if the required computing power cannot be made available for a specific standard with a single digital signal processor 10. It can also be economically more favourable to use a plurality of more economical digital signal processors 10 instead of a single relatively expensive digital signal processor 10 with a higher computing power since the price of a digital signal processor 10 increases disproportionately with its computing power.

The invention claimed is:

1. Signal generator for a DSSS and/or a CDMA signal, having at least one spread sequence memory and at least one digital signal processor, which pre-calculates a spread sequence and stores it in the spread sequence memory in an initialization phase, and which outputs data symbols to at least one image memory in an operating phase, each image memory containing an image table, with which the bits of the current data symbols and at least one current bit of the spread sequence read out sequentially from each spread sequence memory are imaged in an output value, wherein a plurality of channels is present and an image memory is provided for each channel, one I output value and one Q output value respectively being produced, which are added at respectively one adder, and wherein the output values are dependent upon a channel-specific amplification factor contained in the image memory.

2. Signal generator according to claim 1, characterized in that an I spread sequence memory, which contains an I spread sequence, and a Q spread sequence memory, which contains a Q spread sequence, are present for each channel.

3. Signal generator according to claim 1, characterized in that the digital signal processor also outputs control bits to the image memory in addition to the bits of the data symbols.

4. Signal generator according to claim 1, characterized in that a buffer memory is disposed between the digital signal processor and each image memory and in that a chip clock generator is provided, the chip cycle of which is supplied to the spread sequence memories and to the image memories directly and to the buffer memories via a programmable divider which contains a spread factor.

5. Signal generator according to claim 4, characterized in that each buffer memory, when falling below a boundary level, transmits a reload request to the digital signal processor.

6. Signal generator according to claim 4, characterized in that a plurality of channels is present, a common image memory is used for a plurality of channels and, between each buffer memory and the common image memory, a first address register is provided which enables switching of the address supplied to the common image memory dependent upon the current channel.

7. Signal generator according to claim 1, characterized in that writing of the image memory is possible at the same time as the reading of the image memory.

8. Signal generator according to claim 7, characterized in that the address of a memory region of the image memory, which is to be written-to currently, is stored in a second address register and is incremented or decremented after each write cycle.

9. Signal generator according to claim 7, characterized in that a plurality of channels is provided and a channel buffer memory is present for each channel, which buffer memory contains the memory address of the output value (I/Q) to be read from the common image memory for this channel, in that at least one write buffer memory is present which contains the address and the data contents of a region of the image memory to be re-written, and in that a multiplexer is present which connects the channel buffer memories and the write buffer memory alternately to the image memory.

10. Signal generator for a DSSS and/or a CDMA signal, having at least one spread sequence memory and at least one digital signal processor, which pre-calculates a spread sequence and stores it in the spread sequence memory in an initialization phase, and which outputs data symbols to at least one image memory in an operating phase, each image memory containing an image table, with which the bits of the current data symbols and at least one current bit of the spread sequence read out sequentially from each spread sequence memory are imaged in an output value,
characterized in that a buffer memory is disposed between the digital signal processor and each image memory and in that a chip clock generator is provided, the chip cycle of which is supplied to the spread sequence memories and to the image memories directly and to the buffer memories via a programmable divider which contains a spread factor.

11. Signal generator according to claim 10, characterized in that each buffer memory, when falling below a boundary level, transmits a reload request to the digital signal processor.

12. Signal generator according to claim 10, characterized in that a plurality of channels is present, a common image memory is used for a plurality of channels and, between each buffer memory and the common image memory, a first address register is provided which enables switching of the address supplied to the common image memory dependent upon the current channel.

13. Signal generator for a DSSS and/or a CDMA signal, having at least one spread sequence memory and at least one digital signal processor, which pre-calculates a spread sequence and stores it in the spread sequence memory in an initialization phase, and which outputs data symbols to at least one image memory in an operating phase, each image memory containing an image table, with which the bits of the current data symbols and at least one current bit of the spread sequence read out sequentially from each spread sequence memory are imaged in an output value,
characterized in that writing of the image memory is possible at the same time as the reading of the image memory.

14. Signal generator according to claim 13, characterized in that the address of a memory region of the image memory, which is to be written-to currently, is stored in a second address register and is incremented or decremented after each write cycle.

15. Signal generator according to claim 13, characterized in that a plurality of channels is provided and a channel buffer memory is present for each channel, which buffer memory contains the memory address of the output value (I/Q) to be read from the common image memory for this channel, in that at least one write buffer memory is present which contains the address and the data contents of a region of the image memory to be re-written, and in that a multiplexer is present which connects the channel buffer memories and the write buffer memory alternately to the image memory.

* * * * *